United States Patent [19]

Nickel et al.

[11] Patent Number: 4,979,477
[45] Date of Patent: Dec. 25, 1990

[54] IGNITION CIRCUIT FOR A TWO-STROKE ENGINE

[75] Inventors: Hans Nickel, Cottenweiler; Michael Wissmann, Schorndorf-Weiler, both of Fed. Rep. of Germany

[73] Assignee: Andreas Stihl, Waiblingen, Fed. Rep. of Germany

[21] Appl. No.: 388,929

[22] Filed: Aug. 3, 1989

[30] Foreign Application Priority Data

Aug. 3, 1988 [DE] Fed. Rep. of Germany ....... 3826296
Jul. 14, 1989 [DE] Fed. Rep. of Germany ....... 3923237

[51] Int. Cl.$^5$ ...................... F02P 5/145; F02D 43/00
[52] U.S. Cl. ................................... 123/335; 123/339; 123/418
[58] Field of Search ............ 123/335, 339, 418, 198 D

[56] References Cited

U.S. PATENT DOCUMENTS

| 4,344,397 | 8/1982 | Geiger et al. | 123/418 X |
| 4,389,989 | 6/1983 | Hartig | 123/418 X |
| 4,459,951 | 7/1984 | Tobinaga et al. | 123/335 X |
| 4,552,109 | 11/1985 | Baccadoro et al. | 123/418 X |
| 4,633,832 | 1/1987 | Andreasson et al. | 123/335 |

Primary Examiner—Tony M. Argenbright
Attorney, Agent, or Firm—Walter Ottesen

[57] ABSTRACT

The invention is directed to an ignition circuit for an internal combustion engine such as a two-stroke engine of a handheld, portable tool such as a motor-driven chain saw or the like. The engine has a cylinder and a piston conjointly defining a combustion chamber and a crankshaft connected to the piston. The ignition circuit includes a spark plug mounted in the cylinder and voltage source. A switch is actuable between an on-condition wherein the voltage source is connected to the spark plug for initiating a spark in the chamber and an off-condition wherein the voltage source is disconnected from the spark plug. An electronic control circuit actuates the switch between the two conditions in dependence upon the angular position of the crankshaft and other operating parameters of the engine such as the engine speed. The electronic control circuit includes a high-speed control circuit and an idle-speed control circuit for determining the firing time in the control range of the idle speed.

14 Claims, 2 Drawing Sheets

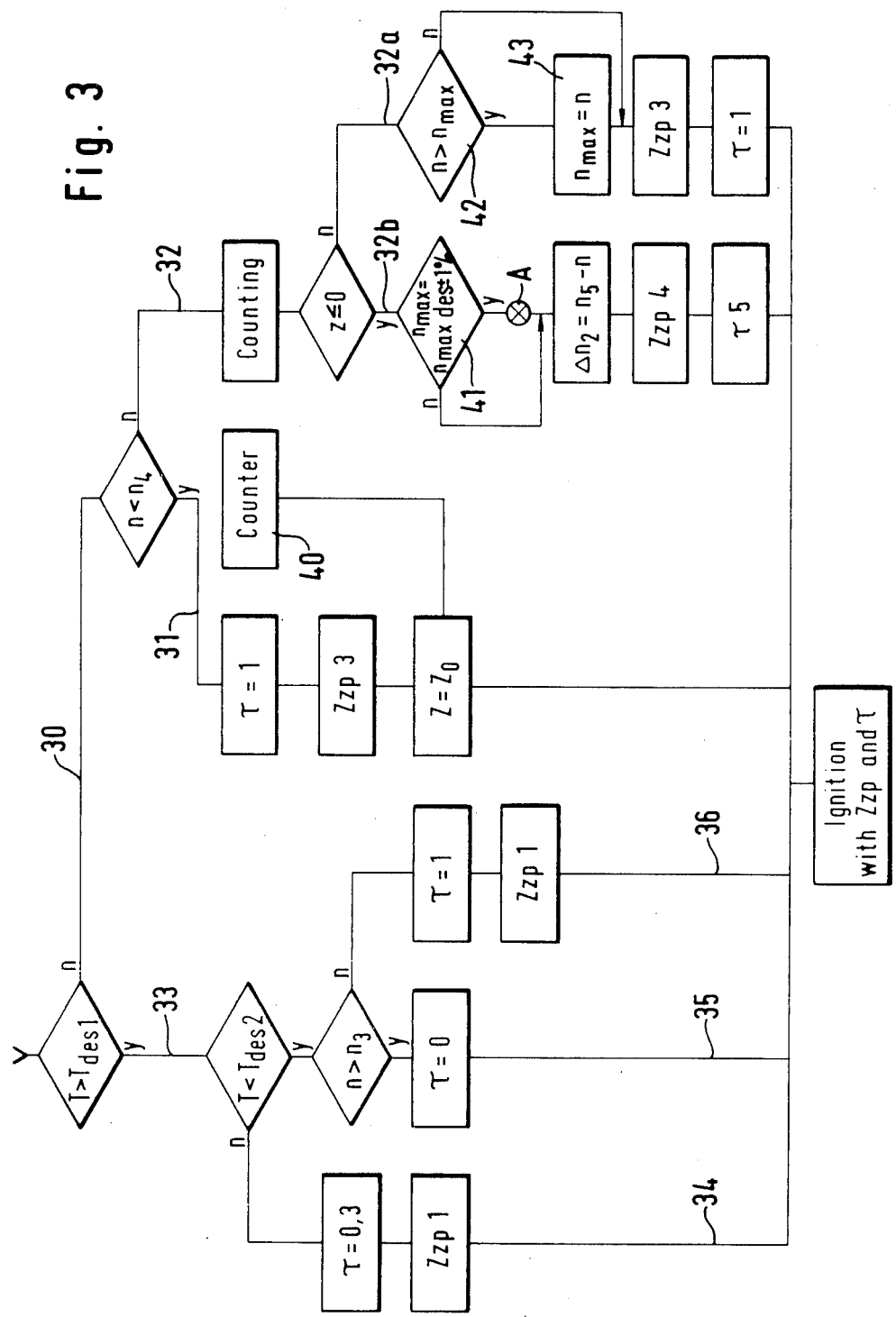

IGNITION CIRCUIT FOR A TWO-STROKE ENGINE

FIELD OF THE INVENTION

The invention relates to an ignition circuit for an internal combustion engine and especially a two-stroke engine for a handheld portable tool such as a motor-driven chain saw or the like. The ignition circuit includes a spark plug which is connected to a voltage source via a switch and an electronic control circuit is provided for actuating this switch. The control circuit closes the switch and initiates a spark in dependence upon the crankshaft angle and other operating parameters such as the speed (rpm) of the engine.

BACKGROUND OF THE INVENTION

An ignition circuit of the kind described above and equipped with a microprocessor as a control circuit was introduced in Sweden in a motor-driven chain saw known as Jonsered 2051. The microprocessor adjusts the ignition for every speed range in order to assure an optimal ignition. However, if there is an acceleration or deceleration from a speed, then the firing time becomes displaced only with increasing or decreasing speed. This results in a dragging change in speed. For this reason, the firing time is not always adapted to the aspirated mixture (lean or enriched) and this causes an unfavorable exhaust gas quality.

Particularly for two-stroke engines, it is especially the speed stability at idle which is problematical; however, it is also not easily set at high speed and at the highest speed. Although the known control of the firing time can be improved, the sought-after stability is, however, not always completely obtainable.

SUMMARY OF THE INVENTION

It is an object of the invention to provide an ignition circuit having an electrical control circuit which is improved so that a control response occurs as a consequence of a controller intervention in order to obtain a high speed stability in every speed range.

The ignition circuit of the invention is for an internal combustion engine, especially a two-stroke engine of a handheld portable tool such as a motor-driven chain saw or the like. The engine has a cylinder and a piston conjointly defining a combustion chamber and a crankshaft connected to the piston. The ignition circuit of the invention includes: a spark plug mounted in the cylinder; a voltage source; a switch actuable between an on-condition wherein the voltage source is connected to the spark plug for initiating a spark in the chamber and an off-condition wherein the voltage source is disconnected from the spark plug; an electronic control circuit for actuating the switch between the conditions in dependence upon the angular position of the crankshaft and other operating parameters of the engine such as the engine speed (n); and, the electronic control circuit including: high-speed control circuit means; and, idle-speed control circuit means for determining the firing time ($Zzp2$) in the control range of the idle speed pursuant to the equation:

$$Zzp2 = A + k_1 \Delta n_1 + k_2 \int \Delta n_1 dt$$

wherein: $A$, $k_1$ and $k_2$ are constants specific to the engine and the control circuit; and, $\Delta n_1$ is the speed difference between the desired idle speed ($n_2$) and the actual speed ($n$).

The control circuit of the ignition circuit according to the invention includes an idle-speed control circuit and a high-speed control circuit which are alternately driven in dependence upon the load condition or the idle condition. In the idle condition, the firing time is determined pursuant to the equation:

$$Zzp2 = A + k_1 \Delta n_1 + k_2 \int \Delta n_1 dt$$

wherein the determined speed deviation has a proportional and integral influence on the controller response. According to a feature of the invention, a control loop having a PI-control character is provided by means of which a high idle-speed stability is obtained.

Even for a slight speed deviation, not only the magnitude of the difference value between the actual speed and the desired speed is included for the determination of the firing time; but, the time deviation and its intensity are also included in this determination. The adapted controller intervention which occurs early permits a rapid return to the desired idle speed so that the high speed stability is provided. With a high speed stability at idle, it is especially with motor-driven chain saws that the centrifugal force driving the saw chain is reliably decoupled and that the saw chain is reliably brought to standstill. With this high speed stability at idle, the danger of accidents with motor-driven chain saws is reduced if they are equipped with an ignition circuit according to the invention.

According to another embodiment of the invention, the control branch of the high-speed control circuit is bypassed via a parallel branch for a certain time duration so that the engine can run up to overspeed. After the time duration has elapsed, the control branch of the high-speed control circuit again becomes active. This is especially advantageous for motor-driven chain saws when very high speeds are required for a short time, for example, such as when starting to cut or when making plunge cuts. Motor-driven chain saws having conventional speed limitations do not permit an overspeed.

The time duration can be fixedly pregiven or it can also be variable. In a preferred embodiment of the invention, a counter is provided in the parallel branch which counts down from a pregiven counter position and switches to the control branch when a counter position is reached which is less than or equal to zero. The time duration determined by counting down to zero from the predeterminable counter position is thereby directly dependent upon the actual overspeed of the engine since the parallel branch is passed through once with each crankshaft revolution.

The parallel branch bypassing the high-speed control circuit is of special significance when making a carburetor adjustment. An overspeed present when passing through the parallel branch is stored in a storage device. After switching over to the control branch, the overspeed stored in the storage device is compared with a pregiven permissible desired highest speed. If the stored overspeed lies within a permissible tolerance band of, for example, ±1% about the desired highest speed, an optical indicator is driven such as a luminescent diode. If the overspeed lies outside of this tolerance band, then the LED is not driven. The indication according to the invention makes possible the adjustment of the carburetor of the engine to an optimal mixture notwithstanding the control arrangement for maintaining speed stability.

This is of significance because otherwise in controlled ignition circuits a possible overspeed caused by an incorrect carburetor adjustment would not occur because of a predetermined speed limit so that the user can no longer determine the false carburetor adjustment from the speed which is limited to the highest speed.

According to a further embodiment of the invention, the control circuit is configured so that one or more ignitions can be suppressed in dependence upon the detected operating parameters in such a manner that a blanking rate t between "zero" (ignition switched off) and "one" (ignitions for each crankshaft revolution) is freely adjustable. The control blanking rate makes possible a rapid change of speed to another speed. For example, if the speed is too high, the blanking rate is reduced whereby ever more ignitions per revolutions are eliminated. The engine speed falls very rapidly in combination with the adjustment of the firing time.

If the speed has to be increased again, the blanking rate is again increased in addition to a change of the firing time whereby more ignitions again occur per given number of revolutions. The engine accelerates rapidly to the desired speed and performs dynamically.

An immediate switchover to the idle-speed control circuit occurs in response to a change from the load condition to the idle condition at high speed. This first sets the blanking rate to "zero" (no ignition) until there is a drop below a predeterminable maximum idle speed. In this way, a rapid run-down to idle speed is obtained which is of substantial significance especially with respect to a reliable and accident-free operation with motor-driven chain saws.

According to another feature of the invention, an unvarying blanking rate is provided by the idle-speed control circuit so that an unvarying ignition pattern is provided during idle. In this way, a reliable ignition is provided at idle speed. If, for example, an ignition is provided only at every second crankshaft revolution (blanking rate=0.5), there is a high probability that an ignitable mixture is formed in the combustion chamber over two crankshaft revolutions so that an ignition will reliably take place with the occurrence of an ignition spark. The engine runs more quietly at idle and the idle speed is easier to maintain.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
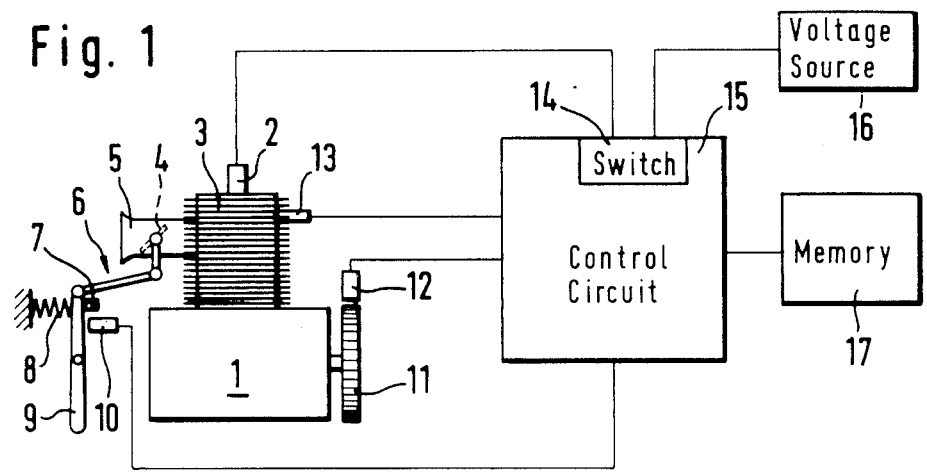
FIG. 1 is a schematic diagram showing the ignition circuit according to the invention in combination with a two-stroke engine.

The ignition circuit shown in FIG. 1 is provided for a two-stroke engine 1 which can, for example, be mounted in a handheld portable tool such as a motor-driven chain saw or the like. The ignition circuit according to the invention can be utilized also with other air-cooled engines or water-cooled engines.

The air-cooled cylinder 3 has an intake pipe 5 with a carburetor and a throttle flap 4 which is actuable from a throttle lever 9 via a linkage unit 6 in order to change the engine speed. In the idle position shown, the throttle lever 9 is resiliently biased against a stop 7 by means of a spring 8.

A position sensor 10 is mounted on the throttle lever 9 and detects the idle position of the throttle lever 9 and sends a signal indicative of this idle position to a control circuit 15.

A pulse generator wheel 11 rotates with the crankshaft of the engine 1 which has marks provided on its outer periphery which generate pulses in a sensor 12 corresponding thereto. These pulses are transmitted as a speed information signal to the control circuit 15. The marks on the pulse generator wheel 11 are arranged thereon so that at least per revolution of the crankshaft one signal is generated in the sensor 12 which is specific to the position of the crankshaft. From this signal, the control circuit 15 can detect the actual position of the crankshaft. Preferably, the marks are arranged over the periphery of the pulse generator wheel 11 at different spacings so that the angular position of the crankshaft can be determined from the spacing of the pulses of the sensor 12.

In the embodiment shown, only those pulse signals are evaluated for determining the actual speed (n) of the engine, which are transmitted via the crankshaft periphery in the range of 45° ahead of bottom dead center and up to 45° after bottom dead center. In this way, the intense speed fluctuations can be eliminated which occur because of deceleration during compression and because of acceleration after ignition.

The cylinder 3 of the engine shown in FIG. 1 is air-cooled and a temperature sensor 13 is mounted thereon. The temperature sensor 13 continuously transmits the actual temperature of the cylinder head to the control circuit 15.

The control circuit configured as an electronic circuit 15 is preferably a microprocessor which processes the signals of the sensors (10, 12, 13) and controls a switch 14 in correspondence thereto. The switch connects a spark plug 2 mounted on the cylinder 3 of the engine 1 to a voltage source 16 for generating a spark discharged in the combustion chamber.

Figure 2:
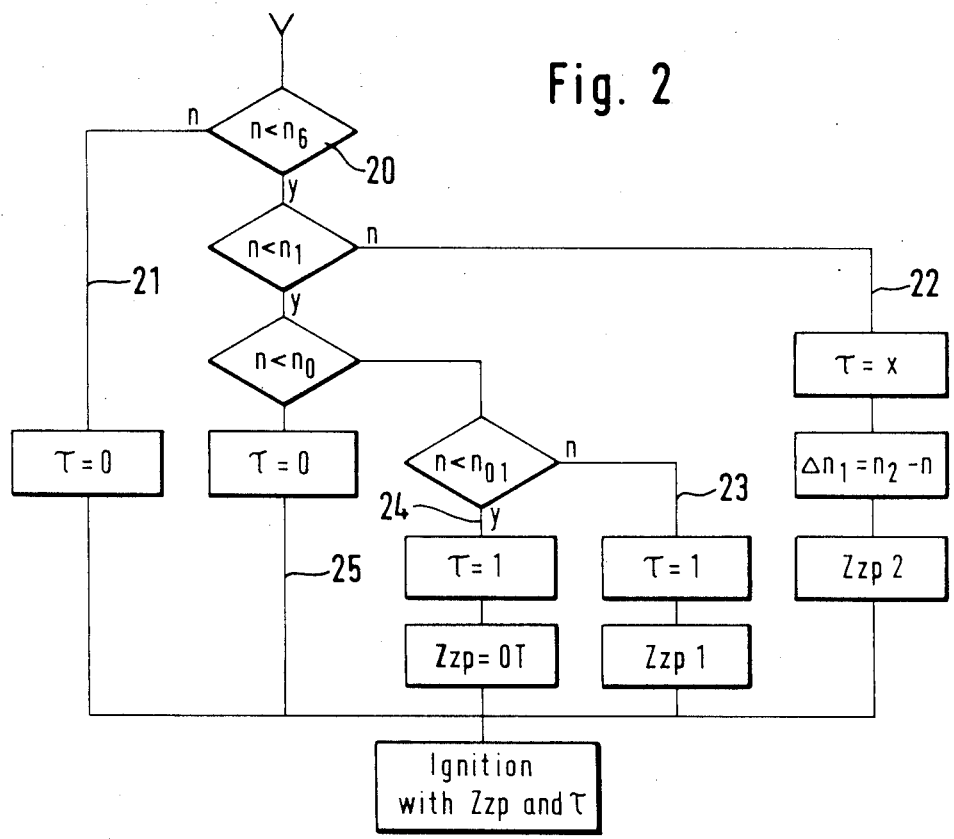
FIG. 2 is a flowchart which is run through when setting the throttle for idle; and, FIG. 3 is a flowchart which is run through when the throttle is actuated at mid and higher speeds.

The microprocessor operates according to the respective flowcharts shown in FIGS. 2 and 3. These flowcharts provide one of the possible embodiments of the ignition circuit according to the invention while utilizing a microprocessor. These embodiments can also be realized as discrete electronic circuits having components which operate according to the flowchart. However, a microprocessor has the advantage that further data can be processed or even stored without greater complexity. Accordingly, the microprocessor can store the following: the total operating time, the operating time at overspeeds or during impermissible or critical conditions. This information can be read out and evaluated appropriately when performing service on the engine.

The microprocessor 15 communicates with a memory 17 wherein especially two different curves Zzp1 and Zzp3 of the firing time Zzp as a function of the engine speed (n) are stored. The curve Zzp1 is orientated according to the idle speed and/or intermediate engine speed; whereas, the curve Zzp3 is fixed for obtaining the highest speed and an overspeed. Furthermore, constants $k_1$ to $k_6$ as well as A, B and C are stored in the memory which are necessary for the computation of firing times Zzp2 and Zzp4 and other quantities such as $\tau_5$.

The basic idea on which the ignition circuit according to the invention is based is seen in that the firing time is changed in correspondence to operating parameters which are present. For controlling the speed (n), an ignition for one or more crankshaft revolutions can be suppressed according to one embodiment of the invention. For this purpose, the variable $\tau$ (blanking rate) is introduced which provides the ratio of crankshaft revolution(s) with ignition to the total number of crankshaft revolution(s). The blanking rate is standardized to a period of, for example, 20 crankshaft revolutions. The period can be freely determined in correspondence to the operating conditions and the engine parameters. Even a time standardization can be useful.

The operation of the ignition circuit according to the invention will now be described.

Starting with a running engine 1, the flowchart according to FIG. 2 for each crankshaft revolution is always then run through when, for example, the positioning sensor 10 of the control circuit 15 announces the idle position of the throttle lever 9. In the idle position of the throttle lever 9, the control circuit 15 examines first (decision block 20) whether the actual speed (n) lies below or above the permissible maximum idle speed ($n_6$) (approximately 3300 rpm). If the actual speed (n) is greater than the maximum speed ($n_6$), then the engine runs down from a higher speed. In order to come rapidly down from a higher speed to idle speed, the blanking rate $\tau=0$ (no ignition) is set so that the engine can be operated pursuant to the principle of overrun cutoff (branch 21 of the flowchart). A branch of this kind can also be used advantageously for limiting speed during the starting operation.

If the speed (n) lies below the maximum idle speed ($n_6$), it is then next examined to determine if the speed (n) is above a minimal idle speed ($n_1$) (approximately 2200 rpm). If this is the case, the blocking rate $\tau$ is set to a predeterminable value (x) between 0 and 1 and the speed deviation $\Delta n_1 = n_2 - n$ is determined wherein $n_2$ is the desired idle speed of approximately 2600 rpm.

With the determined speed deviation $\Delta n_1$, the microprocessor computes the firing time according to the equation:

$$Zzp2 = A + k_1 \Delta n_1 + k_2 \int \Delta n_1 dt$$

wherein: A, $k_1$ and $k_2$ are constants specific to the engine and controller. In this way, not only does the speed deviation itself become included in the computation (proportional component), but also the time of the deviation from the speed; that is, whether the speed deviation rises or drops slightly or intensely. With this consideration of the time-dependent course of the deviation (integral component), an adapted firing time is computed and utilized for the next ignition. This PI-control makes a high speed stability possible since the occurring speed deviations are not permitted to become too large.

After running through the branch 22, the ignition is carried out in correspondence to the set values of $\tau$ and Zzp2 and the speed inquiry as described above is again made at the next crankshaft rotation. If the detected speed still lies in the range between the maximum idle speed ($n_6$) and a minimal idle speed ($n_1$), then the branch 22 is again run through whereby a closed control loop having PI-performance is provided.

By the selection of a blanking rate $\tau$ between 0 and 1 in the branch 22, an ignition pattern is impressed upon the engine which is independent of the operating parameters present. Accordingly, a blanking rate of $\tau=0.5$ can be provided, for example; that is, an ignition occurs only for each second crankshaft revolution. This affords the advantage that even under unfavorable conditions and especially in connection with a two-stroke engine, there is a greater certainty that an ignitable mixture will be present in the combustion chamber for the second crankshaft revolution so that a reliable ignition occurs. In this way, the engine runs quieter at idle and can be more reliably zeroed-in to the desired idle speed. The idle speed remains constant even when the air temperature changes or the engine is hot or cold.

However, if the speed (n) is less than a minimal idle speed ($n_1$), an evaluation occurs as to whether the actual speed (n) is below a lower limit speed ($n_0$) (approximately 400 rpm). If this is the case, the branch 25 is run through and the blanking rate $\tau$ is set to zero thereby shutting off the engine. This branch 25 is especially significant during the starting operation of the engine 1. If the starting speed is below the lower limit speed ($n_0$), the branch 25 is run through thereby setting $\tau=0$, that is, the ignition is suppressed. Only when the starting speed exceeds the lower speed limit ($n_0$), is it possible to have an ignition with the values set in branch 24. When exceeding the limit speed ($n_{01}$), a further ignition occurs with the values set in branch 23. The idle speed control already described occurs after the lower idle speed ($n_1$) is exceeded. In this way, a reliable run-up of the engine during the starting operation occurs.

If the speed still lies above the lower speed limit ($n_0$), an examination is made as to whether the actual speed (n) is still above a limit speed ($n_{01}$) which amounts to approximately 1400 rpm. If this is the case, the blanking rate $\tau$ is set to 1 and the firing time corresponding to the speed (n) is read off of the curve Zzp1 stored in the memory (branch 23).

If the actual speed is below this limit speed ($n_{01}$), the blanking rate $\tau$ is set to 1 and the firing time is set to top dead center (branch 24).

In both cases, the speed again runs up in order to again reach the branch 22. After running through branch 22, the idle speed is controlled according to the PI-controller characteristic whereby the high speed stability is provided.

A further sensor is provided which can, for example, be mounted on the handle of a motor-driven chain saw. With this additional sensor, a determination can be made as to the following: if the operator is holding the chain saw (work position); if the operator has put the chain saw down; or if the operator is merely holding the chain saw without using the same for cutting operations. If the operator releases the handle, the additional sensor announces the same and the branch 21 shown in FIG. 2 whereby the blanking rate ($\tau=0$) is set and the engine comes to standstill. The danger of an accident occurring with the motor-driven chain saw is thereby significantly reduced. Such a sensor can also preferably be configured in the form of a control switch for shutting off the motor-driven chain saw.

The position sensor 10 of the control circuit 15 announces when the throttle lever 9 is not in the idle position. When this occurs, the flowchart according to FIG. 3 is run through.

In the flowchart of FIG. 3, the temperature T of the cylinder head is first interrogated. If this temperature is below a first desired temperature $T_{des1}$ (branch 30), the actual speed (n) is compared with an upper limit speed ($n_4$) (approximately 11,000 rpm) in a downstream speed interrogation. If the actual speed (n) is below the limit speed ($n_4$), then the blanking rate $\tau$ is set to one and the firing time according to curve Zzp3 is read out of the memory 17 (branch 31). In addition, while running through branch 31, a counter 40 is set to a predeterminable counter position. The set counter position is determined in accordance with characteristic data specific to the engine.

If the actual speed (n) is above the limit speed ($n_4$), then the branch 32 is run through and the counter at the counter position $Z_0$ is reduced by one unit to ($Z_0-1$). If the counter position is greater than "zero", the branch 32a is run through and the ignition continues to occur with $\tau=1$ and a firing time read off the curve Zzp3. The speed of the engine can increase beyond the permissible highest speed (overspeed). Since the flowchart is run through with each crankshaft revolution, the counter 40 is reduced with each runthrough by "1" until it is counted down to "0" if the actual speed (n) is greater than the limit speed ($n_4$). For the runthrough of branch 32 which then follows, the control branch 32b is run through when the counter 40 is at zero position. In control branch 32b, first the difference speed $\Delta n_2$ is computed as follows:

$$\Delta n_2 = n_5 - n$$

wherein: $n_5$ is the highest speed and n is the actual speed.

The firing time is then computed pursuant to the equation:

$$Zzp4 = B + k_3 \Delta n_2 + k_4 \int \Delta n_2 dt$$

wherein: B, $k_3$ and $k_4$ are constants specific to the controller and engine. Even in the high-speed control, a controller having a PI-controller characteristic is provided for obtaining a high speed stability.

The blanking rate $\tau$ which is still to be set can be determined according to the equation:

$$\tau_5 = C + k_5 \Delta n_2 + k_6 \int \Delta n_2 dt$$

wherein: C, $k_5$ and $k_6$ are constants specific to the controller and engine.

With the values of Zzp4 and $\tau_5$ set and computed as described above, the speed of the engine can be run down to the permissible highest speed of approximately 13,000 rpm with the closed PI-control path of the control branch 32b being run through for each crankshaft revolution. Only when the actual speed (n) is again below the limit speed ($n_4$) and the cylinder head temperature is still not greater than $T_{des1}$, can the branch 31 again be passed through which again sets the counter 40 and thereby makes possible a short-term increase in speed above the highest speed (overspeed).

It is also possible to determine whether the carburetor of the engine is correctly set with an inquiry of the highest speed (decision block 41) provided in the control branch 32b. If the parallel branch 32a is run through, the actual speed (n) or overspeed is compared (block 42) with a stored highest speed value ($n_{max}$). If the speed (n) is greater than the highest speed ($n_{max}$), the speed (n) is stored in the memory 43 as the new value ($n_{max}$) If the counter 40 is at zero (Z=01), the control branch 32b is again run through. In this branch, the stored speed value ($n_{max}$) is compared with a permissible desired highest speed ($n_{maxdes}$). If the speed value is within a tolerance band of, for example, ±1% of $n_{maxdes}$, an optical indicator A is provided, for example, with a luminescent diode. If the inquiry in the decision block 41 is negative, the indicator A is bypassed and not reached. When the indicator is illuminated, the carburetor has the correct mixture adjustment since with this mixture adjustment, the permissible desired highest speed is not exceeded and there is no drop below this speed.

If the temperature T of the cylinder head has exceeded the value $T_{des1}$, the branch 33 of the high-speed control circuit is run through wherein the actual temperature T is compared with the highest temperature $T_{des2}$. If the cylinder head temperature T is greater, then an unvarying blanking rate of 0.3, for example, is set and the firing time is determined from the curve Zzp1 stored in the memory (branch 34). The firing time is adjusted based upon the overtemperature which is determined. This temperature inquiry assures that for short-term operation the firing time providing optimal capacity is possible without thermal problems occurring during continuous operation or for poor cooling conditions.

If the actual cylinder head temperature T is below $T_{des2}$, then a check of the speed is again made wherein the actual speed (n) is compared with the maximum speed ($n_3$) (approximately 13,000 rpm). If the actual speed (n) is greater than the maximum speed ($n_3$), the blanking rate $\tau$ is set to zero and the ignition is therefore switched off (branch 35). On the other hand, if the actual speed (n) is still beneath the speed ($n_3$), the blanking rate is set to 1 and the firing time is read from the curve Zzp1 in memory 17. The engine then runs up.

For disturbances in the electrical control circuit 15, it can be advantageous to set the firing time to top dead center and the blanking rate $\tau$ to 1.

It is of special significance that a jump-like change of the blanking rate $\tau$ and of the firing time Zzp is possible because of the idle sensor 10. If the engine runs at idle, for example, in branch 22 of FIG. 2 (idle-speed control circuit), and then the throttle is opened, the flowchart of FIG. 3 is immediately run through (high-speed control circuit) since there is an immediate switchover to this flowchart because of the signal of the idle speed sensor 10. In the flowchart of FIG. 3, the branches 30 and 31 are passed through so that $\tau$ jumps to 1 and the firing time jumps to Zzp3 in accordance with the stored curve. In this way, a rapid and powerful run-up of the engine is obtained. The same applies to returning the throttle into the idle position. Because of the signal of the idle position sensor, the control circuit 15 immediately switches to the flowchart of FIG. 2 wherein the branch 21 (overrun circuit) is run through until the idle speed range is reached and, for example, branch 22 is run through for each crankshaft revolution.

It is understood that the foregoing description is that of the preferred embodiments of the invention and that various changes and modifications may be made thereto without departing from the spirit and scope of the invention as defined in the appended claims.

What is claimed is:

1. An ignition circuit for an internal combustion engine of a handheld, portable tool, the engine having a cylinder and a piston conjointly defining a combustion chamber and a crankshaft connected to the piston, the ignition circuit comprising:

a spark plug mounted in the cylinder;
a voltage source;

a switch actuable between an on-condition wherein said voltage source is connected to said spark plug for initiating a spark in said chamber and an off-condition wherein said voltage source is disconnected from said spark plug;

an electronic control circuit for actuating said switch between said conditions in dependence upon the angular position of the crankshaft and at least one other operating parameter of the engine;

said electronic control circuit including: high-speed control circuit means; and, idle-speed control circuit means for determining the firing time ($Z_{zp2}$) in the control range of the idle speed pursuant to the equation:

$$Z_{zp2} = A + k_1 \Delta n_1 + k_2 \int \Delta n_1 dt$$

wherein: A, $k_1$ and $k_2$ are constants specific to the engine and said control circuit; and, $\Delta n_1$ is the speed difference between the desired idle speed ($n_2$) and the actual speed (n).

2. The ignition circuit of claim 1 wherein: said high-speed control circuit means determines the firing time ($Z_{zp4}$) in the control range of the permissible highest speed pursuant to the equation:

$$Z_{zp4} = B + k_3 \Delta n_2 + k_4 \int \Delta n_2 dt$$

wherein: B, $k_3$ and $k_4$ are constants specific to the engine and said control circuit; and, $\Delta n_2$ is the speed difference between the desired highest speed ($n_5$) and the actual speed (n).

3. The ignition circuit of claim 2, wherein said high-speed control circuit means includes a control branch (32b) which can be bypassed by a parallel branch (32a) for a predeterminable time duration.

4. The ignition circuit of claim 3, said parallel branch including a counter having a settable counter position which is reduced with each crankshaft revolution; and, wherein there is a switchback to said control branch (32b) when the position of said counter is equal to or less than zero.

5. The ignition circuit of claim 4, wherein said parallel branch (32a) is blockable in dependence upon an operating parameter of the engine.

6. The ignition circuit of claim 5, wherein said operating parameter of the engine is the temperature of the cylinder thereof.

7. The ignition circuit of claim 4, wherein the highest speed ($n_{max}$) present when running through said parallel branch (32a) is stored and compared with a permissible desired highest speed ($n_{maxdes}$) and wherein an indicator is driven in response to a permissible deviation.

8. The ignition circuit of claim 1, wherein said control circuit suppresses at least one ignition in dependence upon the detected parameters such that a blanking rate ($\tau$) is freely adjustable between zero corresponding to a condition of ignition off and one corresponding to a condition of ignition on.

9. The ignition circuit of claim 8, wherein said idle-speed control circuit means sets the blanking rate ($\tau$) to zero when the actual value speed (n) is greater than the permissible maximum idle speed ($n_6$).

10. The ignition circuit of claim 9, wherein said idle-speed control circuit means switches to a predeterminable blanking rate equal to or less than "1" in the control range of the idle speed.

11. The ignition circuit of claim 8, wherein said high-speed control circuit means determines the blanking rate ($\tau_5$) pursuant to the equation:

$$\tau_5 = C + k_5 \Delta n_2 + k_6 \int \Delta n_2 dt$$

in the control range of the permissible highest speed; and, wherein: C, $k_5$ and $k_6$ are characteristic quantities specific to the engine and said control circuit; and, $\Delta n_2$ is the speed difference between the desired highest speed ($n_5$) and the actual speed (n).

12. The ignition circuit of claim 8, wherein the blanking rate is set to "zero" below a minimum start speed ($n_0$).

13. The ignition circuit of claim 1, wherein said engine is a two-stroke engine and said handheld, portable tool is a motor-driven chain saw.

14. The ignition circuit of claim 1, wherein said one operating parameter is the engine speed (n).

* * * * *

UNITED STATES PATENT AND TRADEMARK OFFICE
CERTIFICATE OF CORRECTION

PATENT NO. : 4,979,477

DATED : December 25, 1990

INVENTOR(S) : Hans Nickel and Michael Wissmann.

It is certified that error appears in the above-identified patent and that said Letters Patent is hereby corrected as shown below:

In column 6, line 53: after "the" (second occurrence) insert -- control circuit 15 runs without further inquiry to --.

In column 7, line 64: between "($n_{max}$)" and "If" insert -- . --.

In column 7, line 64: delete "(Z = 01)," and substitute -- (Z = 0), -- therefor.

Signed and Sealed this

Twenty-first Day of April, 1992

Attest:

HARRY F. MANBECK, JR.

Attesting Officer

Commissioner of Patents and Trademarks